(12) United States Patent
Jin et al.

(10) Patent No.: US 7,634,277 B2
(45) Date of Patent: Dec. 15, 2009

(54) METHOD FOR ALLOCATING CHANNEL RESOURCES FOR IMPROVING FREQUENCY UTILIZATION EFFICIENCY OF WIRELESS COMMUNICATION SYSTEMS

(75) Inventors: Hang Jin, Plano, TX (US); John Grabner, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 50 days.

(21) Appl. No.: 11/204,493

(22) Filed: Aug. 16, 2005

(65) Prior Publication Data

US 2006/0246917 A1    Nov. 2, 2006

Related U.S. Application Data

(60) Provisional application No. 60/675,782, filed on Apr. 28, 2005.

(51) Int. Cl.
*H04W 72/00* (2009.01)
*H04W 40/00* (2009.01)

(52) U.S. Cl. .................... 455/452.2; 455/447

(58) Field of Classification Search ........... 455/450, 455/453, 447, 449, 451, 452.1, 452.2, 446, 455/509; 370/322, 328, 329, 330, 331, 338, 370/341, 348
See application file for complete search history.

(56) References Cited

U.S. PATENT DOCUMENTS

| | | | |
|---|---|---|---|
| 5,507,007 A | 4/1996 | Gunmar et al. ............ 455/33.1 |
| 5,561,842 A | 10/1996 | Ritter et al. ............... 455/33.1 |
| 5,787,344 A | 7/1998 | Scheinert ................... 455/422 |
| 5,850,608 A | 12/1998 | Faruque ..................... 455/447 |
| 5,901,355 A * | 5/1999 | Doner ....................... 455/447 |
| 5,920,819 A * | 7/1999 | Asanuma ................... 455/447 |
| 6,002,935 A | 12/1999 | Wang ........................ 455/447 |
| 6,144,340 A | 11/2000 | Kiiski et al. ............... 342/371 |
| 6,148,219 A | 11/2000 | Engelbrecht et al. ...... 455/562 |
| 6,201,970 B1 | 3/2001 | Suzuki et al. .............. 455/450 |
| 6,212,385 B1 | 4/2001 | Thomas et al. ............. 455/447 |
| 6,275,704 B1 | 8/2001 | Dixon ....................... 455/446 |
| 6,330,429 B1 | 12/2001 | He .......................... 455/67.1 |
| 6,438,380 B1 | 8/2002 | Bi et al. .................... 455/456 |
| 6,442,392 B2 | 8/2002 | Ruutu et al. ............... 455/456 |
| 6,496,535 B2 | 12/2002 | Xu ........................... 375/219 |
| 6,636,736 B1 * | 10/2003 | Billon ....................... 455/447 |
| 6,654,612 B1 | 11/2003 | Advidor et al. ............ 455/450 |
| 6,744,743 B2 * | 6/2004 | Walton et al. .............. 370/318 |
| 6,754,499 B1 * | 6/2004 | Smith ....................... 455/450 |
| 6,778,512 B2 * | 8/2004 | Gipson et al. .............. 370/330 |
| 6,834,193 B1 * | 12/2004 | Linderborg et al. ........ 455/450 |
| 6,871,073 B1 * | 3/2005 | Boyer et al. ............... 455/450 |
| 6,898,431 B1 * | 5/2005 | Peele ........................ 455/453 |
| 6,947,748 B2 * | 9/2005 | Li et al. .................... 455/450 |

(Continued)

*Primary Examiner*—George Eng
*Assistant Examiner*—Christopher M Brandt

(57) ABSTRACT

A method for improving a frequency utilization efficiency for a wireless communication system having a plurality of cells includes the following steps. At least one primary channel is allocated for each cell, the primary channel being different from that of its neighboring cell. One or more secondary channels are allocated for each cell, which have the same frequencies as their corresponding primary channels but differ in configuration, the secondary channels being different in frequency from the primary channel of the same cell. The secondary channel of the cell is activated for carrying communication traffic when the primary channel of the same cell has a capacity of being used exceeding a predetermined threshold value.

17 Claims, 8 Drawing Sheets

U.S. PATENT DOCUMENTS

| | | | |
|---|---|---|---|
| 7,200,407 B1 * | 4/2007 | Smith et al. | 455/452.2 |
| 2001/0046866 A1 * | 11/2001 | Wang | 455/447 |
| 2002/0002052 A1 * | 1/2002 | McHenry | 455/447 |
| 2002/0037015 A1 | 3/2002 | Shanbhag | 370/441 |
| 2002/0041575 A1 | 4/2002 | Karabinis et al. | 370/319 |
| 2002/0058513 A1 * | 5/2002 | Klein et al. | 455/447 |
| 2003/0013451 A1 * | 1/2003 | Walton | 455/447 |
| 2003/0100311 A1 * | 5/2003 | Chung et al. | 455/453 |
| 2003/0125040 A1 * | 7/2003 | Walton et al. | 455/454 |
| 2003/0220112 A1 * | 11/2003 | Bugeja | 455/446 |
| 2004/0190482 A1 * | 9/2004 | Baum et al. | 370/347 |
| 2005/0113099 A1 * | 5/2005 | Eriksson et al. | 455/450 |
| 2005/0197132 A1 * | 9/2005 | Lee et al. | 455/450 |

* cited by examiner

METHOD FOR ALLOCATING CHANNEL RESOURCES FOR IMPROVING FREQUENCY UTILIZATION EFFICIENCY OF WIRELESS COMMUNICATION SYSTEMS

CROSS REFERENCE TO RELATED APPLICATION

This application is related to, and claims the benefits of U.S. Provisional Patent Application Ser. No. 60/675,782, entitled FREQUENCY REUSE FOR WIRELESS COMMUNICATION SYSTEM, which was filed on Apr. 28, 2005.

BACKGROUND

The present invention relates generally to a wireless communication system, and more particularly to a method for allocating channel frequencies among cells of the system clusters in order to improve frequency utilization efficiency.

The total capacity of a wireless communication system is proportional to the total frequency spectrum available to the system. The capacity herein refers to the number of users the system can service, or the amount of information the system can transfer to or from its users during a certain time period. The system capacity can be increased if the frequency spectrum can be reused repeatedly throughout the system. Repeatedly reusing a common frequency band, hereafter referred as a frequency channel, in various cells in a wireless communication system is referred to as frequency reuse.

Conventional frequency reuse is achieved by allocating a number of channels for a number of cells to form a frequency reuse pattern. A plurality of such patterns are repetitively used to provide a larger communications service coverage. Each one of the patterns contains all of the channels available to the system.

Obviously, the number of cells contained in the frequency reuse pattern, which is typically referred to as the frequency reuse factor k, determines the frequency utilization efficiency. A lower frequency reuse factor means that a same frequency band is reused more frequently, and vice versa. However, the reuse factor k cannot be reduced arbitrarily, because, when the reuse factor k is reduced, the spatial separation between two cells where the same frequency channels are reused is reduced, thereby resulting in higher co-channel interferences.

The conventional approach of allocating the channels is to first set the minimum requirement for the signal-to-interference ratio, and then decide the minimum size of the frequency reuse pattern based on the signal-to-interference ratio requirement. One drawback of the conventional approach is that it is not optimized for the most efficient use of available channel resources. As such, it is desirable to have a method of allocating the channels for the cells that balances the aforementioned competing factors. Specifically, it is desirable to have the method reduce the frequency reuse factor, thereby improving the frequency utilization efficiency.

SUMMARY

The present invention discloses a method for improving a frequency utilization efficiency for a wireless communication system having a plurality of cells. The method includes the following steps. At least one primary channel is allocated for each cell, the primary channel being different from that of its neighboring cell. One or more secondary channels are allocated for each cell, which have the same frequencies as their corresponding primary channels but differ in configuration, the secondary channels being different in frequency from the primary channel of the same cell. The secondary channel of the cell is activated for carrying communication traffic when the primary channel of the same cell has a capacity being used exceeding a predetermined threshold value.

The construction and method of operation of the invention, however, together with additional objectives and advantages thereof will be best understood from the following description of specific embodiments when read in connection with the accompanying drawings.

DESCRIPTION

This invention describes a frequency reuse method that improves the frequency utilization efficiency. The following merely illustrates the various embodiments of the present invention for purposes of explaining the principles thereof. It is understood that those skilled in the art will be able to devise various equivalents that, although not explicitly described herein, embody the principles of this invention.

Figure 1:
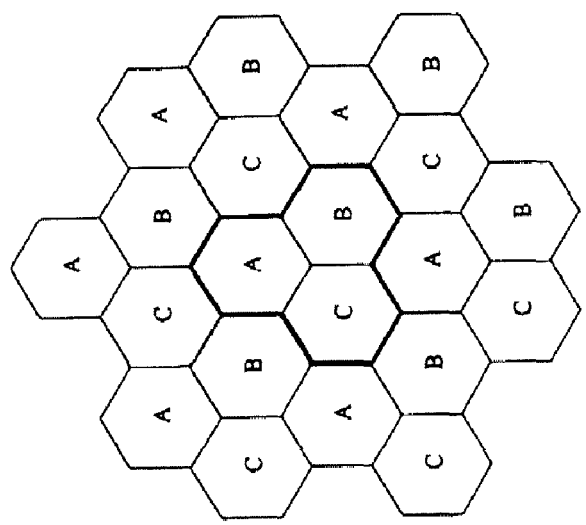
FIG. 1 illustrates a cluster of cells with assigned frequency channels where one frequency reuse pattern contains three cells.

FIG. 1 illustrates a number of frequency reuse patterns, each of which contains three cells, and therefore has a frequency reuse factor k of 3. Three different channels indicated by upper case letters, A, B, and C, are assigned to each of the cells in one frequency reuse pattern.

Figure 2:
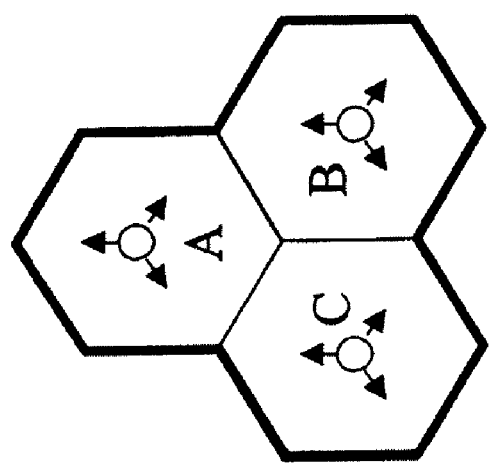
FIG. 2 illustrates a frequency reuse pattern that contains three omni cells.
Figure 3:
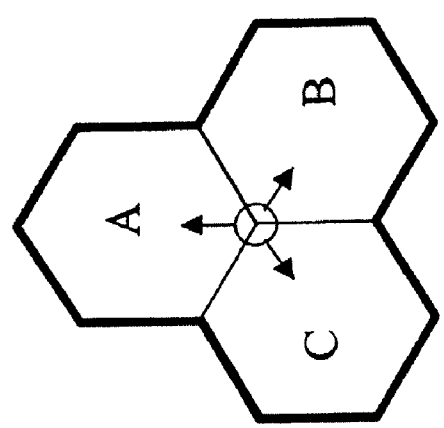
FIG. 3 illustrates a frequency reuse pattern that contains three sector cells.

The cells in the frequency reuse pattern could be of type, such as omni, sector, or a mix of both. In an omni cell, its base transceiver station (BTS) is located in the middle of the cell, with an antenna radiation pattern of 360° in azimuth. In a sector cell, the BTS is located at the cell boundary and its radiation pattern is directional. FIG. 2 is an example of the omni cells, and FIG. 3 is an example of the sector cells. Both are for the case where the frequency reuse factor is equal to 3.

In the frequency reuse pattern, the channels assigned to different cells are different in frequency, and each cell can be assigned with multiple channels. The channel assignment shall meet certain system performance criteria, such as an acceptable carrier-to-interference (C/I) ratio for co-channel and adjacent channel interferences. Any wireless communication system using the frequency reuse pattern shall operate normally if each cell uses only the channels assigned to it.

For each cell, the channels assigned with the initial frequency planning will be designated as the primary channels for their corresponding cells. Similarly, for each channel, the cell, which is assigned with the primary channel, is designated as the channel's primary cell. As the same channel will be reused repeatedly over the wireless communication system according to the frequency reuse pattern, each channel will be associated with multiple primary cells.

Any channel can be used in its primary cells for carrying communication traffic in a way similar to conventional frequency reuse schemes. However, according to one embodiment of the present invention, a channel may not only be used as a primary channel in its primary cells, but may also be borrowed by other cells, not only its primary cells, for carrying communication traffic if certain predefined criteria are met. When used in cells other than its primary cells, a channel is designated as the secondary channel of the borrowing cells. In this embodiment, the following criteria provide a basis to check if the channel borrowing is feasible: the geo-distance between the primary cells and the borrowing cell; the isolation resulting from the path loss between the primary cells and the borrowing cell; the predicted or measured co-channel and adjacent channel C/I ratio if the channel is used in the borrowing cell; the heuristic data of system performance such as packet error rate, system throughput, and call blocking rate, when the channel is used in the borrowing cell as a secondary channel. When a channel and a cell that is not one of the channel's primary cells meet the criteria described above, the channel can be considered as one of the secondary channel candidates for the borrowing cell.

For example, if: the geo-distance between the channel's primary cells and the borrowing cell is greater than a threshold, such as two miles; the isolation resulting from the path loss between the primary cells and the borrowing cell is greater than a threshold such as 20 dB; the predicted or measured co-channel and adjacent channel C/I ratio is greater than a threshold such as 15 dB if the channel is used in the borrowing cell; and there was no performance degradation when the channel was used in the borrowing cell as a secondary channel, then the channel will be considered as one of the secondary channel candidates for the borrowing cell to carry communication traffic.

The list of criteria above provides examples of the factors that one needs to consider if the channel can be used by a cell other than its primary cells. This list is by no means exclusive and it is appreciated that those skilled in the art will be able to add or devise various other criteria that, although not explicitly described herein, embody the principles of this invention.

Figure 4:
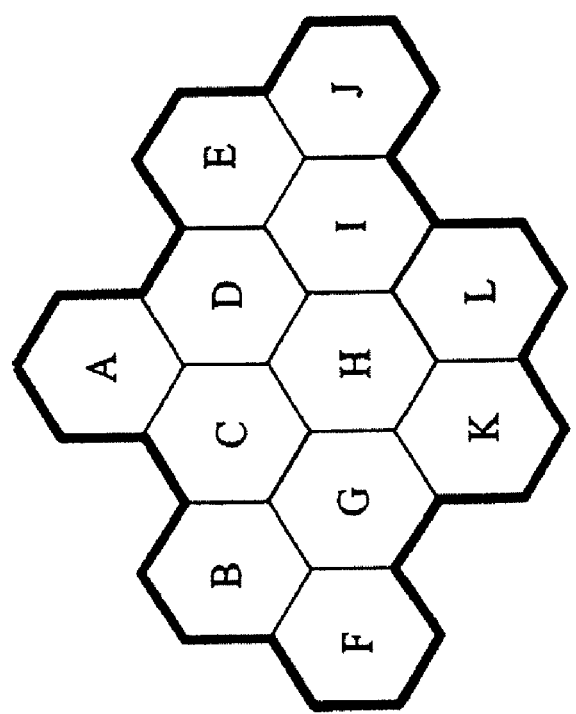
FIG. 4 illustrates a frequency reuse pattern that contains twelve cells, each of which is assigned with a primary channel indicated by an upper case letter in accordance with one embodiment of the present invention.
Figure 5:
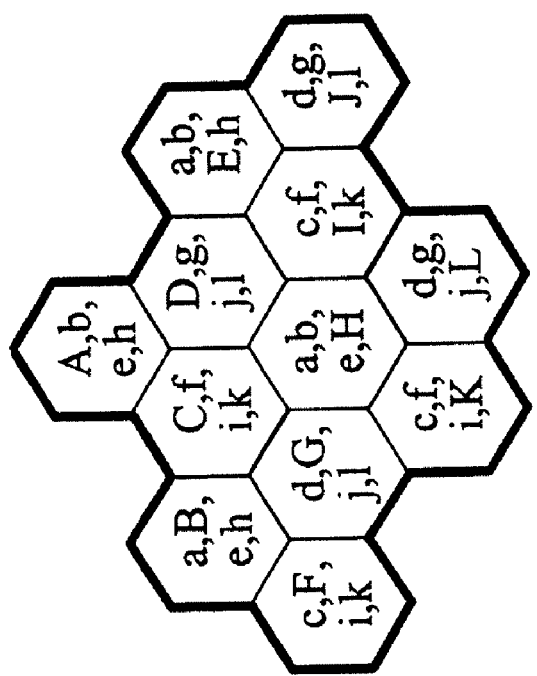
FIG. 5 illustrates a frequency reuse pattern that contains twelve cells, each of which is assigned with one or more secondary channels indicated by lower case letters in accordance with the embodiment of the present invention.
Figure 6:
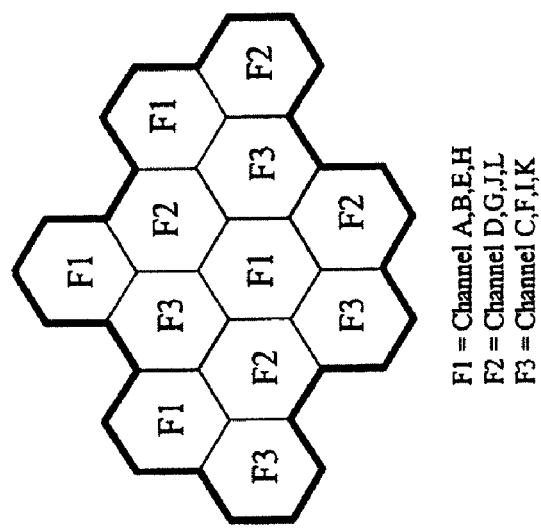
FIG. 6 illustrates a frequency reuse pattern with a reduced frequency reuse factor in accordance with the embodiment of the present invention.

FIG. 4 illustrates an example where an initial frequency reuse pattern has a frequency reuse factor equal to 12. The assigned channels are the primary channels, delineated by upper case letters. For each cell, the primary channels of the cells at the outer ring may be considered as the secondary channel candidates for an inner cell. The secondary channels are delineated by lower case letters, as shown in FIG. 5. Thus, if all secondary channels are actually used to carry traffic in their borrowing cells, an effective frequency reuse factor k=3 can be achieved, as shown in FIG. 6. This reduces the frequency reuse factor from 12 as shown in FIGS. 5 to 3 as shown in FIG. 6.

If a channel is actually used as a secondary channel in a cell other than its primary cells, the channel will be configured differently than if it is used as the primary channel in its primary cells. The following is a list of the channel configuration attributes that may vary, depending on whether the channel is used as a primary channel or a secondary channel: maximum channel power allocated; power control scheme; assignment priority; channel holding time; coding scheme; modulation scheme; and quality of service (QoS) target. It is understood that the list provides only an example, and is by no means exclusive.

The reason for having a different channel configuration when the channel is used as a secondary channel is to create certain mechanisms that help minimize the potential for interference when a channel is used as a secondary channel in the cells other than its primary cells.

Figure 7:
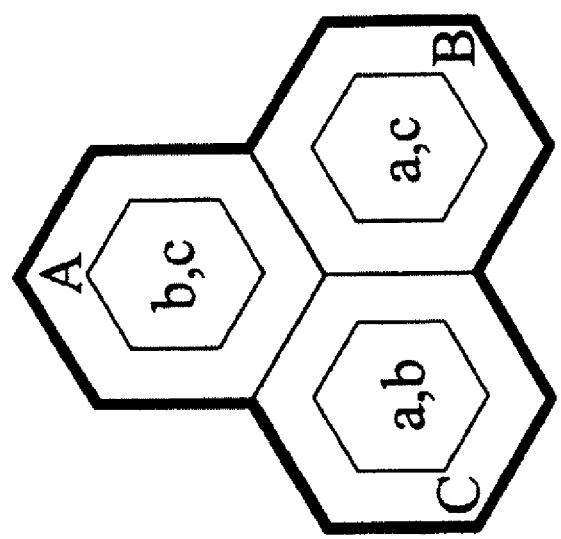
FIG. 7 illustrates a cluster of cells where the secondary cells have less channel power than that of the primary cell in accordance with one embodiment of the present invention.
Figure 8:
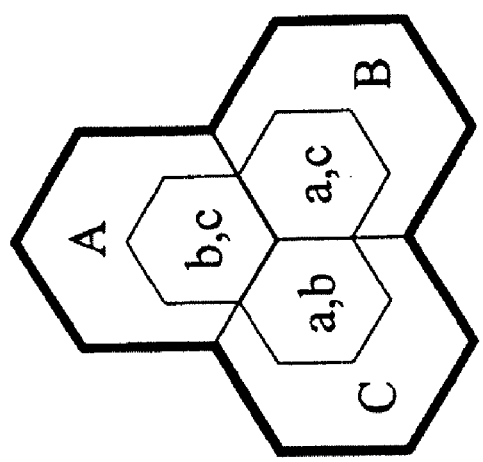
FIG. 8 illustrates a cluster of cells where the secondary cells have less channel power than that of the primary cell in accordance with another embodiment of the present invention.

For example, one could configure the secondary channel so that the maximum channel power allocated is A-10 dB, where A is the maximum channel power allocated for a primary channel. Thus, the maximum power for a secondary channel is 10 dB less than that of a primary channel. This will effectively limit the coverage of the secondary channel to the area close to the BTS, as shown in FIGS. 7 and 8. Since it is most likely that the interferences will occur at the boundaries between cells, excluding the coverage of the secondary channels from the boundary areas will minimize the interferences resulting from the use of secondary channels.

One may also configure the secondary channel so that the power control scheme allows for a power decrease rate that is higher than the power increase rate. This will make it hard for the secondary channel to raise its power. For example, when the Signal-to-Noise Ratio (SNR), or PER, or Bit Error Rate (BER) of the secondary channels fall under a certain threshold, the channel power may be increased with an increment of 1 dB as long as its power is still under the maximum channel allocated. However, when there is excessive channel power, the channel power will be reduced with an increment of 3 dB or the amount that will get the channel power to the desired level. Again, the reason for this is to minimize the potential of the interferences resulting from the use of secondary channels.

One may also configure the secondary channel based on channel assignment priority. For non-critical service, the secondary channels are assigned first. If there are no secondary channels, for instance because all are in use, or the condition of the secondary channel does not meet certain criteria (as explained later), one then considers assigning the primary channels.

One may also configure the secondary channel based on the channel holding time. Channel holding time is the maximum time that a specific channel will be held, even if the quality of the channel has been dropped under a certain threshold. For secondary channels, the channel holding time will be set considerably shorter than that of the primary channel. Thus, it is easier to switch away from secondary channels than from primary channels.

Secondary channel configuration may also be based on a specific coding scheme. The coding scheme for the secondary channels will be stronger than the primary channels so that the secondary channels can operate robustly with less channel power.

The configuration for a secondary channel may also be configured based on a specific modulation scheme. Secondary channels can use lower modulation schemes so that they can operate robustly with less channel power.

Finally, the configuration for a secondary channel may be configured based on the QoS target. The QoS target for secondary channels is ideally lower than that of primary channels.

The list of the channel configuration attributes and their values described herein are just examples of the factors that may be used to differentiate the secondary and primary channels and ensure that the use of channels in cells other than their primary cells will not cause any impairments of system performance. Those skilled in the art will be able to add or devise various other parameters that, although not explicitly described herein, embody the principles of this invention.

Referring to FIG. 7, primary channels are labeled with the upper case letters (A, B, and C) and secondary channels are labeled with the lower case letters (a, b, and c). The channels with the same letters (A or a, B or b, and C or c) are the same channels but configured differently, depending on whether they are used as the primary channel in their primary cells or as secondary channels in other cells. Here, the secondary channels are configured with less channel power, so that their coverage is limited in the area close to the BTS. This will minimize interference caused by using channels in cells other than their primary cells.

Referring to FIG. 8, the primary channels are labeled with upper case letters (A, B, and C) and secondary channels are labeled with the lower case letters (a, b, and c). The channels with the same letters (A or a, B or b, and C or c) are the same channel but configured differently, depending on whether they are used as the primary channel in their primary cells or as secondary channels in other cells. Here, the secondary channels are configured with less channel power so that their coverage is limited in the area close to the BTS. This will minimize the interference caused by using channels in cells other than their primary cells.

For secondary channel assignment and reassignment, the initial frequency reuse pattern and channel assignment are designed in such a way that if all cells use their primary channels only, the system operates normally with little co-channel or adjacent channel interference. However, in the case when traffic demand exceeds a threshold capacity of the primary channels, secondary channels will be activated to increase the cell capacity, thereby improving the frequency utilization efficiency.

For each cell, there is a list of secondary channel candidates (and their preferred channel configurations) that may be used when the capacity of the primary channels is limited. In actual implementation, each cell constantly monitors traffic and usage capacity of the primary channels. If the usage capacity of the primary channels exceeds a certain percentage, for instance 70%, the system may be set up to activate some or all of the secondary channels on the candidate list for traffic carrying.

The list of the active secondary channels is broadcast by the BTS to all its terminals. The terminals monitor the downlink interference levels on the frequencies occupied by the active secondary channels and periodically report them back to the BTS. Similarly, the BTS monitors the uplink interference levels on the frequencies occupied by the active secondary channels. The downlink and uplink interference levels will be used as one of the selection criteria for secondary channels used for traffic carrying.

When there is a channel request for a terminal, the BTS will first look at the channel usage of the primary channels. If the usage capacity of the primary channels exceeds a certain percentage, for instance 75%, the system may be set to consider assigning secondary channels. The system may look at all secondary channels and select one or a few for the assignment that has the highest merit scores for that terminal.

The merit score of a secondary channel can be derived from the interference level measured on the frequency occupied by the secondary channel and the heuristic data of secondary channel system performance.

Interference level metrics may be the interference levels measured at the current time, or may be the weighted average levels over a certain period of time. The heuristic data of system performance is collected over a certain period of time when the secondary channel is actually used in the cell by the terminals. The system performance includes such parameters as data rate, C/I ratio, and total system throughput. The collection period should ideally be relatively long as compared to frame duration.

When the system considers selecting a secondary channel for the assignment, it uses the following logic to score all active secondary channels: over a certain period of time, T, where time is much longer than frame length of, for example, one hour, the actual usage of the secondary channel for the terminal is Tu. Tp is the amount of time system performance is poor. If Tu>A, and Tp/Tu>B, this secondary channel will be blacked out for this terminal for a period of time, Tb, where A and B are constants.

For example, A could be one minute; B could be 50%. During the blackout period, Tb, the score of the secondary channel for this terminal is negative infinity and Tb could be one hour.

If the heuristic data of system performance passes the criteria (the secondary channel is not blacked out currently for the terminal), its interference levels will be checked. If either the uplink or downlink interference level is above its thresholds, that is, Iu>Iu_threshold, or Id>Id_threshold, the score for this secondary channel will be negative infinity. This secondary channel will not be considered for assignment to the terminal. If not, its score will be calculated as follows:

$$\text{score}=A*(Iu\_threshold-Iu)+B*(Id\_threshold-Id)$$

where A and B are two positive numbers that remain constant for all score calculations. They are introduced so that one can have different weights for uplink and downlink interference levels. For example, one could use A=0.7, and B=0.3, so the uplink interference has more weight than downlink interference on the merit score. Iu_threshold could be set as the thermal noise floor, plus a constant offset like 5 dB. Similarly, Id_threshold could be set as the thermal noise floor, plus constant offset like 10 dB. Iu_threshold does not necessarily equal Id_threshold.

If there is no secondary channel that can pass the selection criteria, a primary channel will be assigned for that terminal. This is the reason why the system needs to begin considering assigning secondary channels before primary channels are depleted. Often, for a channel request, the system cannot find a proper secondary channel and it has to resort to the primary channels.

The monitoring of the interference levels on all active secondary channels is carried out continuously regardless of whether the secondary channel is actually used for traffic. However, the heuristic data of the system performance is collected only when the secondary channel is used for traffic.

The merit scores of all active secondary channels could be updated on a continuous basis, like once every second. At such time, if the updated score of the occupied secondary channel is lower than a certain threshold, the system shall release the secondary channel and re-select a secondary or primary channel for the terminal.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevethe-

What is claimed is:

1. A method comprising:
    at a base station that serves a corresponding cell in a wireless communication network comprising a plurality of cells, allocating at least one primary channel such that the primary channel of the cell is different from that of its neighboring cell served by another base station;
    at the base station, allocating one or more secondary channels for its cell, wherein each of the one or more secondary channels for respective ones of the plurality of cells is associated with a corresponding primary channel and has the same frequency as its corresponding primary channel, and wherein within the cell the frequency of the secondary channel is different from the frequency of the primary channel;
    at the base station, receiving from at least one terminal that it serves a channel performance report indicating performance on the secondary channel, and an indication of actual usage of the secondary channel and interference on the secondary channel;
    at the base station, generating a merit score for its secondary channel based on the channel performance report received from the at least one terminal and actual usage on the secondary channel, wherein generating the merit score comprises generating over a period of time that is longer than a transmission frame length, a first value representing actual usage of the secondary channel as measured by the at least one terminal and a second value representing an amount of time that performance on the secondary channel is poor based on the channel performance report; and
    at the base station, determining whether to activate the secondary channel based on a comparison of the first and second values with a threshold.

2. The method of claim 1, wherein allocating one or more secondary channels for each cell further comprises designating a channel that is a primary channel for a first cell as a secondary channel for a second cell based on one or more predetermined factors.

3. The method of claim 2, wherein the predetermined factors comprise a geographical distance between the first cell and the second cell.

4. The method of claim 2, wherein the predetermined factors comprise a level of isolation between the first cell and the second cell.

5. The method of claim 2, wherein the predetermined factors comprise a carrier-to-interference ratio for co-channel and adjacent channel interference as between the first cell and the second cell.

6. The method of claim 2, wherein the predetermined factors comprise heuristic data of system performance when the secondary channel in the second cell is activated for carrying the communication traffic.

7. The method of claim 1, wherein the secondary channel has a maximum transmit power lower than a maximum transmit power of its corresponding primary channel.

8. The method of claim 1, and further comprising, at the base station, comparing the first value with a first threshold and comparing a ratio of the second value to the first value with a second threshold, and wherein determining comprises determining not to activate the secondary channel for the at least one terminal for a period of time when the first value exceeds the first threshold and the ratio exceeds the second threshold.

9. The method of claim 1, and further comprising, at the base station, employing a power control scheme in the secondary channel of its cell that differs from the power control scheme used in the corresponding primary channel such that a power decrease rate is greater than a power increase rate in the secondary channel.

10. The method of claim 8, wherein when the first and second values are such that the secondary channel should be considered for activation for the at least one terminal, further comprising, at the base station, comparing downlink interference on the secondary channel with a downlink interference threshold and comparing uplink interference on the secondary channel with an uplink interference threshold, and wherein determining further comprises determining not to activate the secondary channel for the at least one terminal when the downlink interference exceeds the downlink interference threshold or the uplink interference exceeds the uplink interference threshold, and otherwise generating the merit score for the secondary channel comprises computing a sum of a first weighted difference between the uplink interference and the uplink interference threshold and a second weighted difference between the downlink interference and the downlink interference threshold.

11. The method of claim 1, wherein at the base station, employing a coding scheme for its secondary channel that is stronger than a coding scheme used for its corresponding primary channel.

12. The method of claim 1, wherein at the base station, employing a modulation scheme for its secondary channel that is lower than a modulation scheme used for its corresponding primary channel.

13. A method comprising:
    at a base station that serves a corresponding cell in a wireless communication network comprising a plurality of cells, allocating at least one primary channel such that the primary channel of the cell is different from that of its neighboring cell served by another base station;
    at the base station, allocating one or more secondary channels for its cell, wherein each of the one or more secondary channels for respective ones of the plurality of cells is associated with a corresponding primary channel and has the same frequency as its corresponding primary channel, and wherein within the cell the frequency of the secondary channel is different from the frequency of the primary channel, wherein allocating comprises designating a channel that is a primary channel for a first cell served by the base station as a secondary channel for a second cell served by another base station based on one or more predetermined factors comprising at least one of: a geographical distance between the first cell and the second cell, a level of isolation between the first cell and the second cell, and a carrier-to-interference ratio for co-channel and adjacent channel interference as between the first cell and the second cell; and
    at the base station, receiving from at least one terminal that it serves a channel performance report indicating performance on the secondary channel and an indication of actual usage of the secondary channel and interference on the secondary channel;
    at the base station, generating a merit score for its secondary channel based on the channel performance report received from the at least one terminal, and actual usage on the secondary channel, wherein generating the merit score comprises generating over a period of time that is longer than a transmission frame length, a first value representing actual usage of the secondary channel as measured by the at least one terminal and a second value representing an amount of time that performance on the secondary channel is poor based on the channel performance report;

at the base station, determining whether to activate the secondary channel based on a comparison of the first and second values with a threshold.

14. The method of claim 13, and further comprising, at the base station, comparing the first value with a first threshold and comparing a ratio of the second value to the first value with a second threshold, and wherein determining comprises determining not to activate the secondary channel for the at least one terminal for a period of time when the first value exceeds the first threshold and the ratio exceeds the second threshold.

15. The method of claim 14, wherein when the first and second values are such that the secondary channel should be considered for activation for the at least one terminal, further comprising, at the base station, comparing downlink interference on the secondary channel with a downlink interference threshold and comparing uplink interference on the secondary channel with an uplink interference threshold, and wherein determining further comprises determining not to activate the secondary channel for the at least one terminal when the downlink interference exceeds the downlink interference threshold or the uplink interference exceeds the uplink interference threshold, and otherwise generating the merit score for the secondary channel comprises computing a sum of a first weighted difference between the uplink interference and the uplink interference threshold and a second weighted difference between the downlink interference and the downlink interference threshold.

16. The method of claim 13, wherein at the base station, employing a coding scheme for its secondary channel that is stronger than that a coding scheme used for its corresponding primary channel and using a modulation scheme for its secondary channel that is lower than a modulation scheme used for its corresponding primary channel.

17. The method of claim 13, and further comprising, at the base station, employing a power control scheme in the secondary channel of its cell that differs from the power control scheme used in the corresponding primary channel such that a power decrease rate is greater than a power increase rate in the secondary channel.

* * * * *